US012797792B2

(12) United States Patent
Gregoire et al.

(10) Patent No.: US 12,797,792 B2
(45) Date of Patent: Nov. 17, 2026

(54) GAS-SORPTION MEASUREMENT DEVICE

(71) Applicant: California Institute of Technology, Pasadena, CA (US)

(72) Inventors: John M. Gregoire, Pasadena, CA (US); Ryan J R Jones, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 457 days.

(21) Appl. No.: 18/529,939

(22) Filed: Dec. 5, 2023

(65) Prior Publication Data

US 2024/0181390 A1 Jun. 6, 2024

Related U.S. Application Data

(60) Provisional application No. 63/430,148, filed on Dec. 5, 2022.

(51) Int. Cl.

| | |
|---|---|
| ***B01L 3/00*** | (2006.01) |
| ***B01D 15/08*** | (2006.01) |
| ***B01D 53/14*** | (2006.01) |
| ***B01D 53/18*** | (2006.01) |
| ***B01D 53/34*** | (2006.01) |
| ***B01D 53/62*** | (2006.01) |
| ***B01D 53/78*** | (2006.01) |
| ***B01F 33/302*** | (2022.01) |
| ***B01F 33/3033*** | (2022.01) |
| ***B01J 8/00*** | (2006.01) |
| ***B01J 8/02*** | (2006.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C02F 1/469*** | (2023.01) |
| ***C08L 5/08*** | (2006.01) |
| ***C12M 1/34*** | (2006.01) |
| ***C12M 3/06*** | (2006.01) |
| ***C12N 1/14*** | (2026.01) |

(Continued)

(52) U.S. Cl.
CPC ......... *B01D 53/78* (2013.01); *B01D 53/1412* (2013.01); *B01D 53/1475* (2013.01); *B01D 53/18* (2013.01); *B01D 53/346* (2013.01); *B01D 53/62* (2013.01); *B01D 2251/306* (2013.01); *B01D 2251/604* (2013.01); *B01D 2257/504* (2013.01)

(58) Field of Classification Search
CPC ............... B01D 53/78; B01D 53/1412; B01D 53/1475; B01D 53/18; B01D 53/346; B01D 53/62; B01D 2251/306; B01D 2251/604; B01D 2257/504; B01D 2258/06
See application file for complete search history.

(56) References Cited

U.S. PATENT DOCUMENTS 5,980,608 A * 11/1999 Dietz ...................... F17C 11/00 96/111
2012/0207659 A1* 8/2012 Pinard Westendorf ...................... B01D 53/96 423/220

* cited by examiner

*Primary Examiner* — Oyeleye Alexander Alabi
(74) *Attorney, Agent, or Firm* — Gavrilovich, Dodd & Lindsey LLP

(57) ABSTRACT

The present invention relates to a gas-sorption measurement device to characterize the gas binding and sorption capacity of a liquid sorbent, and methods of use thereof.

20 Claims, 5 Drawing Sheets

(51) Int. Cl.

| | |
|---|---|
| ***C12N 1/20*** | (2026.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/6851*** | (2018.01) |
| ***C12Q 1/686*** | (2018.01) |
| ***G01K 1/14*** | (2021.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/01*** | (2006.01) |
| ***G01N 21/03*** | (2006.01) |
| ***G01N 21/05*** | (2006.01) |
| ***G01N 21/29*** | (2006.01) |
| ***G01N 21/33*** | (2006.01) |
| ***G01N 21/35*** | (2014.01) |
| ***G01N 21/65*** | (2006.01) |
| ***G01N 21/75*** | (2006.01) |
| ***G01N 21/77*** | (2006.01) |
| ***G01N 27/07*** | (2006.01) |
| ***G01N 27/28*** | (2006.01) |
| ***G01N 27/416*** | (2006.01) |
| ***G01N 30/02*** | (2006.01) |
| ***G01N 30/60*** | (2006.01) |
| ***G01N 30/72*** | (2006.01) |
| ***G01N 31/10*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/575*** | (2026.01) |
| ***G01N 33/57515*** | (2026.01) |
| ***G01N 33/58*** | (2006.01) |
| ***G01N 33/68*** | (2006.01) |
| ***G01N 33/72*** | (2006.01) |
| ***G01N 35/00*** | (2006.01) |
| ***H05B 45/10*** | (2020.01) |

GAS-SORPTION MEASUREMENT DEVICE

CROSS REFERENCE TO RELATED APPLICATIONS

This application claims the benefit of U.S. Provisional Patent Application Ser. No. 63/430,148, filed on Dec. 5, 2022, and which is incorporated herein in its entirety.

STATEMENT OF GOVERNMENT SUPPORT

This invention was made with government support under Grant No. DE-SC0023427 awarded by the Department of Energy. The government has certain rights in the invention.

FIELD OF INVENTION

The present invention relates to a gas-sorption measurement device to characterize the gas binding and sorption capacity of a liquid sorbent, and methods of use thereof.

BACKGROUND

The efficient sorption of $CO_2$ from dilute gas streams is a critical process for enabling carbon sequestration and sustainable energy technologies. Thermogravimetric analysis (TGA) is a traditional method for measurement of $CO_2$ sorption, where the weight of a sorbent in a $CO_2$-containing atmosphere is assumed to be due to $CO_2$ sorption after calibrating and accounting for solvent evaporation. TGA is particularly convenient for studying sorbents for thermal $CO_2$ release, as the temperature-dependence of $CO_2$ binding is readily measured via temperature control in the system. For sorbents that are intended to be electrochemically regenerated and/or used in reactive capture and conversion (RCC) schemes via electrochemical reduction to carbon-containing chemicals or fuels, it is desirable to couple the sorption experiment with an electrochemical cell.

SUMMARY

The disclosure provides a gas-sorption measurement device, which characterizes targeted gas sorption by a liquid sorbent via measurement of the partial pressure of the targeted gas. Furthermore, the measurement can be carried out using an inexpensive sensor. The gas-sorption measurement device disclosed herein can also be interfaced with automated preparation of liquid sorbents. Thus, the device can be used for mass screening of liquid sorbents.

In a particular embodiment, the disclosure provides a device that is configured to analyze the sorption properties of a liquid sorbent for a targeted gas, the device comprising the following structural components: a sorbent chamber configured to comprise a liquid sorbent and a headspace above the liquid sorbent; a liquid handling pump that introduces the liquid sorbent into the sorbent chamber; one or more mass flow controllers that introduces components of a gas mixture into the sorbent chamber, wherein one of the components of the gas mixture is the targeted gas that interacts with the liquid sorbent; a detector that measures the partial pressure of the targeted gas in the headspace of the sorbent chamber; a plurality of valves and vents that are in fluid communication with the sorbent chamber that are configured to open or close to modulate the flow of fluids in the device; a gas recirculation pump that recirculates the gas mixture through the liquid sorbent in the sorbent chamber through a first recirculation loop; optionally, a second recirculation loop that is configured for liquid sorbent analysis; and optionally, a flow-through knockout drum that is configured to analyze the headspace of the sorbent chamber; wherein the sorption properties of a liquid sorbent for the targeted gas is determined by the device operating in either (i) a constant moles mode where the detector measures the rate of sorption of the targeted gas from the headspace of the sorbent chamber, or (ii) a constant pressure mode where a constant partial pressure of the targeted gas is maintained by introducing the targeted gas by a mass flow controller and measuring the total amount of the targeted gas introduced into the device. In a further embodiment, the detector comprises an infrared sensor to measure the partial pressure of the targeted gas. In another embodiment or further embodiment of any of the foregoing, the plurality of valves comprise solenoid valves that are electronically opened and closed. In another embodiment or further embodiment of any of the foregoing, the device further comprises: a controller that controls the opening and closing of the solenoid valves. In another embodiment or further embodiment of any of the foregoing, the gas recirculation pump is a peristaltic pump or a diaphragm pump. In another embodiment or further embodiment of any of the foregoing, the device further comprises components to flush or initialize the sorbent chamber and the first recirculation loop, the components comprising: a second liquid handling pump that is configured to introduce a solvent into the sorbent chamber to displace the liquid sorbent; and a flush valve that is connected to a gas supply comprising a gas or gas mixture that is configured to flush and/or initialize the system with the gas or gas mixture of the gas supply when opened. In another embodiment or further embodiment of any of the foregoing, the device further comprises a mounting plate that fixes a portion of the plurality of valves, and the sorbent chamber in a certain orientation when attached to the mounting plate. In another embodiment or further embodiment of any of the foregoing, the device comprises: the second recirculation loop; and the flow-through knockout drum. In another embodiment or further embodiment of any of the foregoing, the device operates under constant pressure mode, and wherein the one or more mass flow controllers are programed to periodically introduce the gas mixture comprising the targeted gas to the sorbent chamber in order to maintain a defined partial pressure level for the targeted gas.

In a certain embodiment, the disclosure also provides a device that is configured to analyze the sorption properties of a liquid sorbent for a targeted gas, the device comprising the following structural components: a sorbent chamber configured to comprise a liquid sorbent and a headspace above the liquid sorbent; a liquid handling pump that introduces the liquid sorbent into the sorbent chamber; one or more mass flow controllers that introduces components of a gas mixture into the sorbent chamber, wherein one of the components of the gas mixture is the targeted gas that interacts with the liquid sorbent; a detector comprising an infrared sensor that measures the partial pressure of the targeted gas in the headspace of the sorbent chamber; a plurality of solenoid valves, and vents that are in fluid communication with the sorbent chamber that are configured to open or close to modulate the flow of fluids in the device; a peristaltic or diaphragm pump that recirculates the gas mixture through the liquid sorbent in the sorbent chamber through a first recirculation loop; a controller that electronically opens and closes the solenoid valves; optionally, a second recirculation loop that is configured for liquid sorbent analysis; and optionally, a flow-through knockout drum that is configured to analyze the headspace of the sorbent chamber; wherein the sorption properties of a liquid sorbent for the targeted gas is determined by the device operating in either (i) a constant moles mode where the detector measures the rate of sorption of the targeted gas from the headspace of the sorbent chamber, or (ii) a constant pressure mode where a constant partial pressure of the targeted gas is maintained by introducing the targeted gas by a mass flow controller and measuring the total amount of the targeted gas introduced into the device. In another embodiment or further embodiment of any of the foregoing, wherein the controller comprises a computer or cell phone that electronically or wirelessly controls the operation of the solenoid valves. In another embodiment or further embodiment of any of the foregoing, the device further comprises components to flush and/or initialize the sorbent chamber and the first recirculation loop, the components comprising: a second liquid handling pump that is configured to introduce a solvent into the sorbent chamber to displace the liquid sorbent; and a flush valve that is connected to a gas supply comprising a gas or gas mixture that is configured to flush or initialize the system with the gas or gas mixture of the gas supply when opened. In another embodiment or further embodiment of any of the foregoing, the device further comprises a mounting plate that fixes a portion of the plurality of valves, and the sorbent chamber in a certain orientation when attached to the mounting plate. In another embodiment or further embodiment of any of the foregoing, the device comprises: the second recirculation loop; and the flow-through knockout drum. In another embodiment or further embodiment of any of the foregoing, device operates under constant pressure mode, and wherein the one or more mass flow controllers are programed to periodically introduce the gas mixture comprising the targeted gas to the sorbent chamber in order to maintain a defined partial pressure level for the targeted gas.

In a particular embodiment, the disclosure further provides a device that is configured to analyze the sorption properties of a liquid sorbent for a targeted gas, the device comprising the following structural components: a sorbent chamber configured to comprise a liquid sorbent and a headspace above the liquid sorbent; a liquid handling pump that introduces the liquid sorbent into the sorbent chamber; one or more mass flow controllers that injects components of a gas mixture into the sorbent chamber, wherein one of the components of the gas mixture is the targeted gas that interacts with the liquid sorbent; a detector comprising an infrared sensor that measures the partial pressure of the targeted gas in the headspace of the sorbent chamber; a plurality of solenoid valves, and vents that are in fluid communication with the sorbent chamber that are configured to open or close to modulate the flow of fluids in the device; a peristaltic or diaphragm pump that recirculates the gas mixture through the liquid sorbent in the sorbent chamber through a first recirculation loop; a mounting plate that fixes a portion of the plurality of solenoid valves, and the sorbent chamber in a certain orientation when attached to the mounting plate; a controller that electronically opens and closes the solenoid valves; a second liquid handling pump that is configured to introduce a solvent into the sorbent chamber to displace the liquid sorbent; and a flush valve that is connected to a gas supply comprising a gas or gas mixture that is configured to flush or initialize the system with the gas or gas mixture of the gas supply when opened; optionally, a second recirculation loop that is configured for liquid sorbent analysis; and optionally, a flow-through knockout drum that is configured to analyze the headspace of the sorbent chamber; wherein the sorption properties of a liquid sorbent for the targeted gas is determined by the device operating in either (i) a constant moles mode where the detector measures the rate of sorption of the targeted gas from the headspace of the sorbent chamber, or (ii) a constant pressure mode where a constant partial pressure of the targeted gas is maintained by introducing the targeted gas by a mass flow controller and measuring the total amount of the targeted gas introduced into the device. In another embodiment or further embodiment of any of the foregoing, the device comprises: the second recirculation loop; and the flow-through knockout drum.

In a certain embodiment, the disclosure provides a method of measuring the sorption properties of a liquid sorbent for a targeted gas using a device disclosed herein, the method comprising: introducing a liquid sorbent and a gas mixture comprising a targeted gas that interacts with the liquid sorbent into the sorbent chamber; turning on the gas recirculation pump; injecting the gas mixture comprising the targeted gas to the sorbent chamber periodically in order to maintain a defined partial pressure level for the targeted gas; measuring the partial pressure of the targeted gas in the headspace of the sorbent chamber in a continuous or periodic manner over a defined period of time; identifying the total amount of targeted gas that is supplied to the device; and calculating the sorbent properties of the liquid sorbent for the targeted gas based upon the total amount of targeted gas that is supplied to the device. In another embodiment or further embodiment of any of the foregoing, the targeted gas is selected from $CO_2$, CO, $SO_2$, $H_2S$, $CS_2$, NO, volatile organic compounds (VOCs), HCHO, $NH_3$, $NO_X$, CFC, $N_2$, $O_2$, ozone, hydrogen, $N_2O$, methane, ethane, propane, acetylene, butane, and any combination of these gasses. In another embodiment or further embodiment of any of the foregoing, the targeted gas is $CO_2$.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the disclosure and, together with the detailed description, serve to explain the principles and implementations of the invention.

DETAILED DESCRIPTION

Figure 1A:
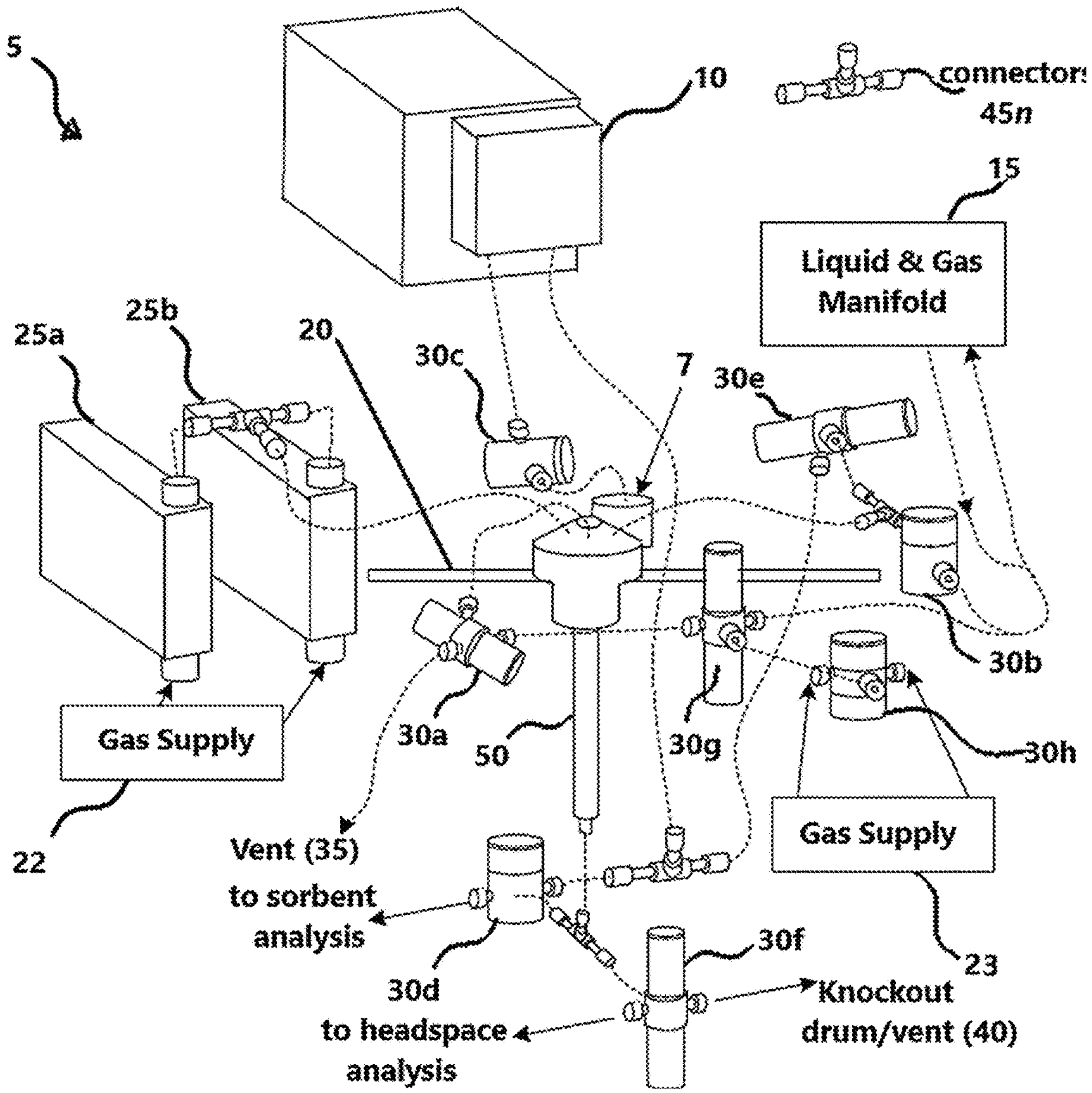
FIG. 1A-C depicts an embodiment of a gas-sorption measurement device of the disclosure. (A) The drawing depicts the primary components showing the valve and pump layout for automating headspace and liquid sorbent preparation, execution of the sorption experiment under constant partial pressure of a targeted gas (e.g., $CO_2$), and post-sorption characterization of the sorbent and/or headspace. (B) The device schematic further outlines the gas and liquid handling system including "Syringe pump A", which houses the primary liquid sorbent, and the sorbent media preparation may be expanded using additional syringe pumps which are accommodated by the flow selection valve. The base solvent, which is deionized water as an example, is used during cleaning procedures, motivating its integration with a reservoir for automated syringe refill. The analogous gas used for system flushing and headspace initialization is either a gas that does not interact with the liquid sorbent, or a chosen gas mixture comprising the targeted gas (e.g., $CO_2$). Additionally, mass flow controllers (MFCs) are used to deliver gasses to device, thereby enabling controlled dosing of the headspace. The MFCs have integrated solenoid valves, with the targeted gas (e.g., $CO_2$) valve in an upstream configuration because this MFC has an integrated total pressure sensor for auxiliary monitoring of the system. The primary recirculation loop for sorption measurements is depicted. The valving configuration for optional additions to the system are shown, including a second recirculation loop for sorbent analysis and a flow-through knockout drum for headspace analysis. (C) Provides an embodiment for the high-level state operation of the gas-sorption measurement device where the optional post-sorption analyses are marked (*). After initialization, automated execution of the sample loop can be used to characterize various sorbent formulations, gas compositions, and or post-sorption analyses.

As used herein and in the appended claims, the singular forms "a", "an", and "the" include plural referents unless the context clearly dictates otherwise. Thus, for example, reference to "a device" includes a plurality of such devices and reference to "the valve" includes reference to one or more valves and so forth.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Also, the use of "or" means "and/or" unless stated otherwise. Similarly, "comprise", "comprises", "comprising", "include", "includes", and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated by reference in full for the purpose of describing and disclosing methodologies that might be used in connection with the description herein. Moreover, with respect to any term that is presented in one or more publications that is similar to, or identical with, a term that has been expressly defined in this disclosure, the definition of the term as expressly provided in this disclosure will control in all respects.

It should be understood that this disclosure is not limited to the particular methodology, protocols, and reagents, etc., described herein and as such may vary. The terminology used herein is for the purpose of describing particular embodiments or aspects only and is not intended to limit the scope of the present disclosure.

Other than in the operating examples, or where otherwise indicated, all numbers expressing quantities of ingredients or reaction conditions used herein should be understood as modified in all instances by the term "about." The term "about" when used to describe the present invention, in connection with percentages means +1% to +5%. The term "about," as used herein can mean within an acceptable error range for the particular value as determined by one of ordinary skill in the art, which can depend in part on how the value is measured or determined, e.g., the limitations of the measurement system. Alternatively, "about" can mean a range of plus or minus 20%, plus or minus 10%, plus or minus 5%, or plus or minus 1% of a given value. Alternatively, the term can mean within an order of magnitude, within 5-fold, or within 2-fold, of a value.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Gas separations, purification, and concentration are critical for a host of technologies, in particular capture and concentration/conversion of carbon dioxide from industrial streams or directly from the air, which is referred to as direct air capture (DAC). Measurement of the sorption is challenged by slow kinetics.

The disclosure provides a gas-sorption measurement device for accelerated characterization of the rate and extent of the sorption of a gaseous species. In the studies presented herein the device and methods utilized carbon dioxide as the targeted gas, which sorption in the liquid phase, was demonstrated herein using alkaline aqueous solutions. Measurement of the sorption is challenged by slow kinetics, which is addressed by the device that utilizes recirculation of the gaseous phase through the liquid phase with an in-line gas monitor. The instrument also includes a liquid characterization capability, demonstrated here using an electrochemical flow cell, to determine the properties of the liquid phase. Such measurements determine the properties of the liquid as a function of the amount of sorbed gasses, for example, the pH or electrochemical window for electro-reduction and oxidation. The primary components of the instrument include a gas metering and mixing manifold, a sorption solution preparation manifold, a reaction chamber, a recirculation pump, valving for controlling flow path, a pressure transducer, and gas analysis sensor(s). The instrument has been shown to provide 10 parts per million sensitivity for sorption of carbon dioxide with approximately 1 s time resolution. The instrument has been fully automated with custom software that enables automated, high-throughput screening of various combinations of sorption solvent, dissolved or suspended molecular sorbents, and gas compositions and pressures.

Figure 1B:
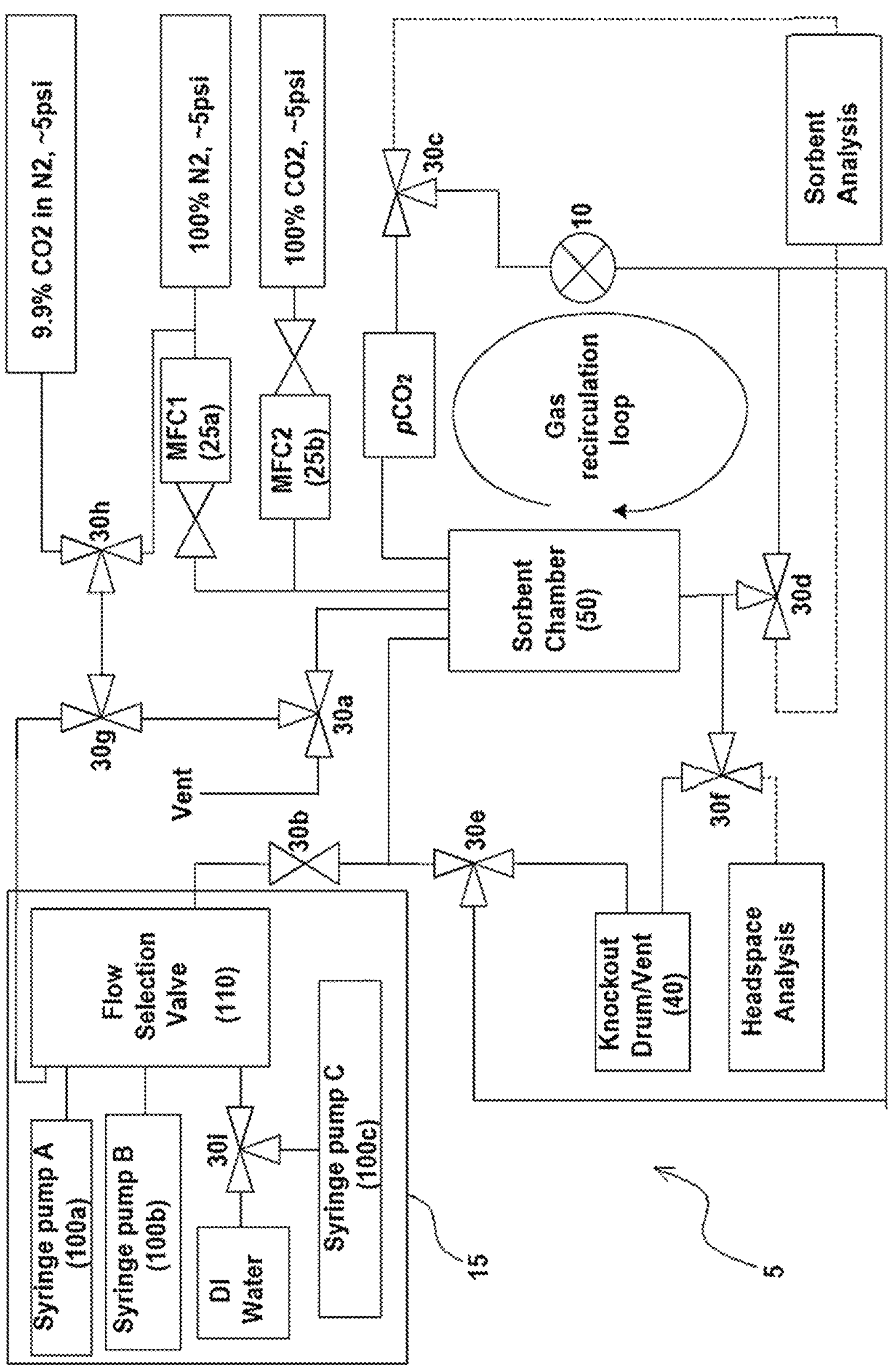

An embodiment of the gas-sorption measurement device is shown in FIG. 1A with the liquid and gas handling diagram shown in FIG. 1B. The system is designed to measure the partial pressure of, for example, $CO_2$ in the headspace ($pCO_2$) using an infrared sensor while the headspace is bubbled through the liquid sorbent via the recirculation pump, which accelerates gas-liquid equilibration. Starting from a given amount of $CO_2$ in the headspace, the CCSI can be operated in a "constant moles" mode in which the sensor measures the rate of sorption of $CO_2$ from the headspace. A thermodynamic assessment of the $CO_2$ sorption in this operating mode relies on measurement of $p_{co_2}$, typically at low partial pressures. Alternatively, CCSI can be operated in a "constant pressure" mode by implementing a feedback loop to inject $CO_2$ into the headspace to maintain a constant $p_{co_2}$. This mode of operation is useful for characterizing sorption thermodynamics. While CCSI may accommodate experiments at various total pressures, the present work is limited to near-ambient (1 atm) headspace pressure. A total pressure gauge in included in the system, although the data from this sensor is not used in the present discussion.

Figure 1C:
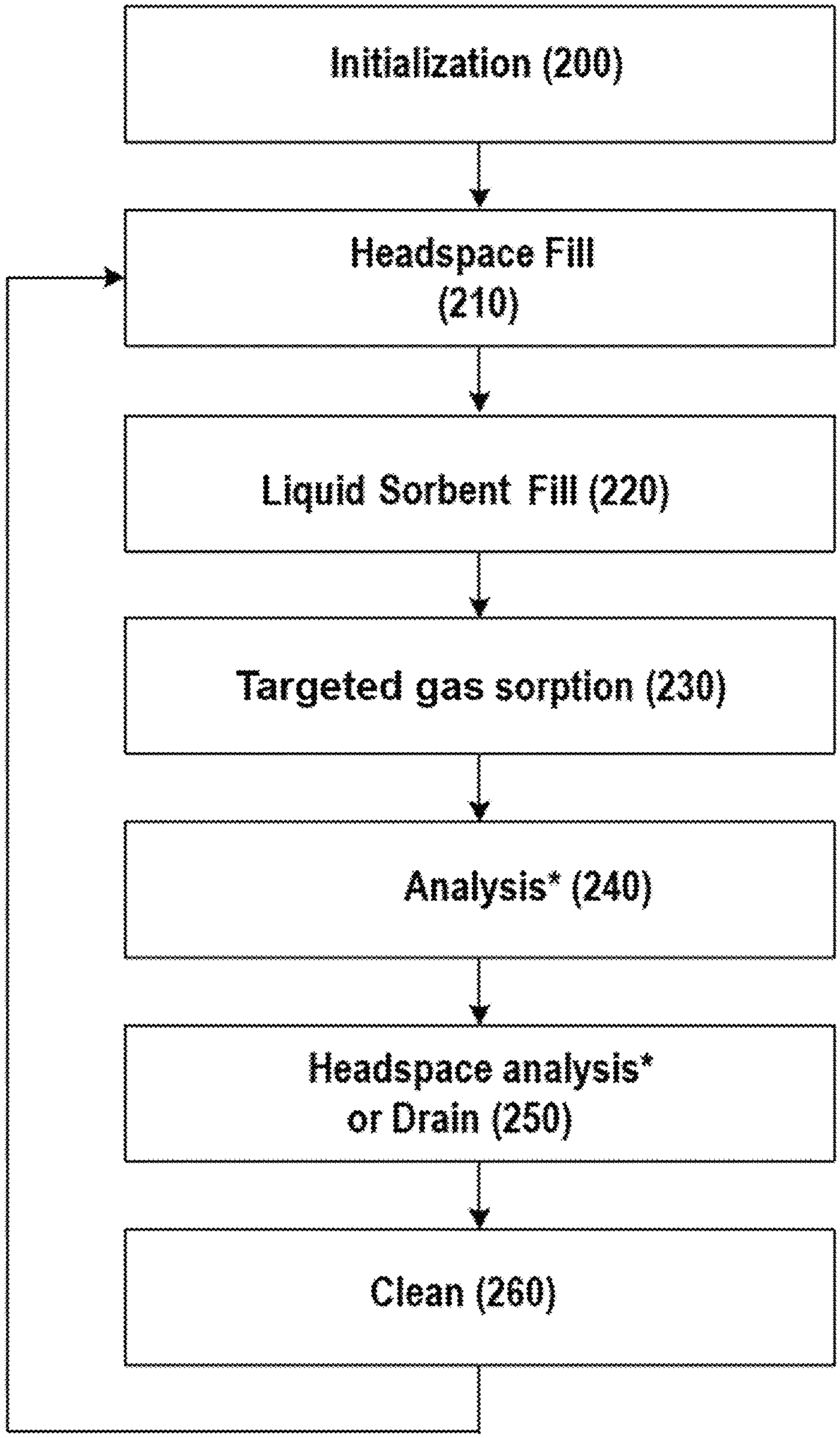

The high-level steps for operating the gas-sorption measurement device for each experiment cycle are shown in FIG. 1C. The liquid sorbent for each experiment is prepared via programmed injection into the sorption chamber from 1 or more syringe pumps. The headspace is prepared prior to the injection of the liquid sorbent, and the sorption experiment is considered to start at the initiation of the sorbent injection into the recirculation cell. After liquid injection, the recirculation pump is activated for the duration of the measurement, which is typically about 1 hour (e.g., 5-60 mintues) for most measurements in the present discussion. Within a couple minutes the data exhibits whether there is substantial $CO_2$ sorption from the given headspace, although for the data and experiments herein longer experiments were performed to observe the path toward gas-liquid equilibration. As noted in FIG. 1C, the experiment cycle can conclude by extraction of the liquid and purging of the instrument to complete the experiment cycle.

The headspace for each gas-sorption measurement experiment can be prepared a number of ways. A gas cylinder with 9.9% $CO_2$ in $N_2$ provides the standard process gas. Flushing the system with this gas, injecting the liquid sorbent, and sealing the system provides the initial state where the moles of $CO_2$ in the system is limited to the headspace volume of 0.098 atm $CO_2$. The amount of $CO_2$ sorbed by the liquid ($m_{tot}$) is then determined by the $CO_2$ added to the system via the mass flow controller (MFC) to maintain this $p_{co_2}$.

If there are multiple values of $p_{co_2}$ that are routinely used, custom gases may be prepared accordingly and selected as the source gas for this primary method of preparing the headspace. In standard operation, occasionally lower pressures of $CO_2$, e.g., 1% or 0.1%, can be used, which are prepared via an alternative method wherein the atmosphere is initialized with pure $N_2$. After liquid injection and sealing of the system, the feedback loop for maintaining the setpoint $p_{co_2}$ is started, where the lack of $CO_2$ in the headspace results in immediate $CO_2$ injection. From here, the experiment proceeds as described above, and the calculation of $m_{tot}$ accounts for the $CO_2$ from the MFC that is in the gas phase.

While $m_{tot}$ quantifies the amount of $CO_2$ in the liquid phase, the goal of the gas-sorption measurement experiment is to quantify the chemically bound $CO_2$. Thus, $m_{tot}$ is modelled as the sum of the physisorbed unbound $CO_2$ ($m_{phys}$), as dictated by Henry's Law coefficient for the solvent, and the chemisorbed $CO_2$ ($m_{chem}$).

The disclosed gas-sorption measurement device is an automated instrument for characterization of gas (e.g., carbon dioxide) capture from a headspace into liquid sorbent media. The instrument interfaces sorption characterization with automated preparation of the liquid sorbent and headspace gas, as well as extension of the instrument for subsequent characterization of the liquid and gas. The instrument enables characterization of novel sorbent-solvent combinations, a critical component of a materials acceleration platform for accelerating the development of carbon capture, concentration, and utilization technologies.

As discussed herein, the exemplary work was performed using $CO_2$ and measuring $p_{co_2}$. The experiment utilized premixed 9.9% $CO_2$ gas or was dosed using a pure $N_2$ to obtain 0.1% $CO_2$. In the former preparation, the reading from the $CO_2$ sensor is recorded after the headspace is prepared, providing the setpoint value for the feedback control of the $CO_2$ injections. With this method, the absolute accuracy of the $CO_2$ sensor is inconsequential. It was anecdotally observed that the absolute reading can drift. For automated execution of lower $p_{co_2}$ experiments, e.g., 0.1%, the zero-level of the sensor should be calibrated in the pure $N_2$ atmosphere to ensure accurate preparation of the gas via MFC feedback to the setpoint $p_{co_2}$.

The MFC control algorithm used is relatively simple and designed to mitigate the over-pressurization of the targeted gas (e.g., $CO_2$) in the system. It is believed that the gas-liquid exchange kinetics are the limiting factor for experiment throughput, although the opportunity for increasing the efficiency of $p_{co_2}$ through, for example, a proportional-integral-derivative (PID) controller.

The gas-sorption measurement device disclosed herein provides the ability for post-sorption analysis of the sorbent media. In the example, this analysis is done by manual pH measurements. FIG. 1B illustrates the valve configuration for implementing post-sorption characterization of the target gas-loaded liquid and headspace gas. These steps are noted as optional in FIG. 1C, the code can include the steps for executing such post-sorption analyses, as well as the additional cleaning steps.

In comparison to a TGA instrument, the gas-sorption measurement device disclosed herein provides automated preparation of sorbent media, execution of sorption characterization, and triggering subsequent liquid and gas analyses. The design employed herein utilizes a relatively inexpensive set of components and has notable cost savings over TGA.

An overview of an exemplary gas-sorption measurement device 5 is presented in FIG. 1A. As shown in FIG. 1A, the device 5 comprises a sorbent chamber 50. Sorbent chamber 50 is configured to comprise a liquid sorbent and a headspace above the liquid sorbent. Sorbent chamber 50 can be made of any material (e.g., glass, plastic, metal, etc.) or combination of materials so long as the material does not react with the liquid adsorbent, the target gas, or preclude the measurement of the partial pressure of the target gas in the headspace of the sorbent chamber 50. Further, the dimensions of sorbent chamber 50 can vary as long as sorbent chamber can accommodate a liquid sorbent and a headspace above the liquid sorbent. Furthermore, the device disclosed herein can comprise a plurality of sorbent chambers 50 (not shown). The liquid sorbent that is introduced into sorbent chamber 50 is chosen or designed to interact with a specific target gas that is being measured by device 5. While the liquid sorbent demonstrated in the studies presented herein was chosen based upon its sorption properties for the target gas carbon dioxide ($CO_2$), it should be understood that any liquid sorbent can be used in device 5, including alternate liquid sorbents for $CO_2$. Moreover, the liquid sorbent can be an experimental liquid sorbent, whose sorbent properties for a targeted gas is being analyzed using a device disclosed herein. Further, the targeted gas is not limited to $CO_2$ and can include any number of gases including, but not limited to, hydrocarbon and fuel gases (e.g., methane, ethane, propane, acetylene, butane, etc.); industrial waste gases (e.g., CO, $SO_2$, $H_2S$, $CS_2$, NO, volatile organic compounds (VOCs), HCHO, $NH_3$, $NO_x$, CFC, etc.); commercial and noble gases (e.g., $N_2$, $O_2$, helium, argon, ozone, neon, ozone, helium, krypton, hydrogen, $N_2O$, etc.); and other types of gases. The partial pressure of the targeted gas in the headspace can be measured using detector 7. Detector 7 can use any type of sensor to measure the partial pressure of the targeted gas in the headspace ($p_{gas}$) of sorbent chamber 50. In a particular embodiment, detector 7 uses an infrared sensor to measure $p_{gas}$. Infrared based gas sensors are available by a number of manufacturers, including the SprintIR® 6S-20 sensor by Gas Sensing Solutions Ltd (Cumbernauld, UK). To provide an initial state, device 5 can be flushed or initiated with a gas mixture via a valve connected to a gas supply 22, such as valve 30*h*, prior to the addition of the liquid sorbent to sorbent chamber 50. The gas mixture supplied to flush or initiate the system from gas supply 23 should mirror the gas mixture being used for measurements. The gas mixture comprising the target gas can be supplied to device 5 via one or more mass flow controllers, such as mass flow controller 25*a* and mass flow controller 25*b*. Additional mass flow controllers can also be used to add additional component gases to the gas mixture. The mass flow controllers provide controllable gas delivery to the device. The amount of the target gas sorbed by the liquid sorbent ($m_{tot}$) is then determined by accounting for the amount of target gas that added to the system via a mass flow controller, such as mass flow controller 25*a*, to maintain the partial pressure of the target gas in the headspace of sorbent chamber 50. The one or more mass flow controllers, such as mass flow controller 25*a* and mass flow controller 25*b*, are connected to sorbent chamber 50 via tubing (shown as a dashed line). The type of tubing should be selected so as to not react to components of the gas mixture and ideally not soft walled tubing that deforms with changing pressure. As such the tubing can be made from metal (e.g., stainless steel), stronger plastic (e.g., polyether ether ketone tubing), glass, and other types of material. The liquid sorbent can be introduced to sorbent chamber 50 by use of a liquid handling pump, such as syringe pump shown in FIG. 1B. In FIG. 1A, the liquid sorbent is being provided to sorbent chamber 50 via tubing connected to valve 30*b* which is further connected liquid and gas manifold 15. The tubing can be made from metal (e.g., stainless steel), stronger plastic (e.g., polyether ether ketone tubing), glass, and other types of material. Once sorbent chamber 50 is loaded with the liquid sorbent and the gas mixture is introduced, the system is closed off and the gas recirculation pump 10 is turned on. Gas recirculation pump 10 recirculates the gas mixture through the liquid sorbent in the sorbent chamber 50 in a recirculation loop. In the recirculation loop there are various values that can be opened or closed, including value 30*c*, valve 30*d*, valve 30*e*, and value 30*f*. Valves 30*c* and valve 30*d* are generally open so that the gas mixture is recirculated through sorbent chamber 50, while valves 30*e* and 30*f* are closed. However, if sorbent analysis and headspace analysis is too be performed then valve 30*f* may be open along with valve 30*c* and valve 30*d*. As shown in FIG. 1A, each of valve 30*a*-30*i* are depicted as having three ports (except for valve 30*b*), also shown in connector 45*n*. Valve 30*b* is a two-port valve that is open only when the two ports are open. In contrast, a valve that has three ports is open when two ports are open or when all three ports that are open. A valve that is closed can have no ports open or only one port open. With regards to valves 30*a*-30*i*, the opening and closing of each of the valves can be by an electronic or analog process, or combination thereof. In a particular embodiment, valves 30*a*-30*i* comprise solenoids that are opened and closed electronically. In a further embodiment, a controller controls the opening or closing of valves 30*a*-30*i*. The controller can be directly or indirectly electronically connected to each of valves 30*a*-30*i* via wires, or directly or indirectly wirelessly connected to each of valves 30*a*-30*i*, or some combination thereof. Device 5 further comprises mounting plate 20 that provides stability and fixes a portion or all of valves 30*a*-30*i*, and sorbent chamber 50 in a certain orientation when attached to the mounting plate 20.

With the sorption of the targeted gas in the gas mixture by the liquid sorbent, the partial pressure of the targeted gas in the headspace of the sorbent chamber 50 is reduced. The mass flow controller senses the partial pressure drop by the targeted gas and the mass flow controller, such as mass flow controller 25*a*, injects more of the targeted gas into the system. The measurement/target gas injections are carried out over a period of time, and after which the determination of the total amount of the target gas provided to the device is then tallied. Using the algorithms disclosed herein, the sorption properties of the liquid sorbent for the targeted gas is then determined. With regards to the period of time to carry out the foregoing measurements, the period of time can be 1 min, 2 min, 3 min, 4 min, 5 min, 10 min, 15 min, 20 min, 25 min, 30 min, 35 min, 40 min, 45 min, 50 min, 55 min, 60 min, 70 min, 80 min, 90 min, 100 min, 110 min, 120 min, 180 min, or a range of time that includes or is between any two of the foregoing time points, including fractional increments thereof. In additional embodiments, device 5 can comprise knockout drum/vent 40 to perform headspace analysis and/or comprise vent 35 to perform sorbent analysis. In such a case, valve 30*d* and/or valve 30*e* are opened to access knockout drum/vent 40 and vent 35.

Turning now to specific orientation of the structural features of the gas-sorption measurement device 5, FIG. 1B provides how valves 30*a*-30*i* are connected and oriented to each other as well as to sorbent chamber 50 and the other structural features of device 5. The liquid sorbent can be introduced into device 5 by way of a syringe pump 100*a* or other type of liquid handling pump. Device 5 can comprise additional liquid handling pumps, such as syringe pump 100*b* or syringe pump 100*b* to introduce additional liquid sorbents or solvents (e.g., deionized water) to sorbent chamber 50. Additionally, a reservoir comprising a solvent, such as DI water shown in FIG. 1B, can be used to flush or clean the system of the liquid sorbent after the measurements are completed. In such a case, the reservoir (as well as syringe pump 100*c*) is connected to device 5 by way of valve 30*i*. As noted above, valve 30*i* comprises three ports, so DI water from the reservoir can be used to flush or clean the system while the port to syringe pump 100*c* is closed. Device 5 can further comprise flow selection valve 110 if there are multiple liquid handling pumps connected to device 5 (such as syringe pump 100*a* and syringe pump 100*b*). If device 5 only comprises one liquid handling pump (such as syringe pump 100*a*), then flow selection valve 110 is merely optional. The liquid sorbent can flow into the sorbent chamber only when valve 30*b* is open. The gas mixture comprising the target gas is introduced into the sorbent chamber by mass flow controller 25*a* and mass flow controller 25*b*. While FIG. 1B depicts the gas flowing into mass flow controller 25*a* is $N_2$ and the gas flowing into mass flow controller 25*b* into $CO_2$, it should be understood that any type of gas may be used instead of those shown in the figure, including the gas mixture of $CO_2$ in $N_2$. For example, CO may be used instead of $CO_2$, or argon can be used instead of $N_2$. For purpose of this figure, $CO_2$ is indicated as being the targeted gas to define the sorption properties of the liquid sorbent, but as noted above any number of other types of targeted gas may be used to study the sorption properties of the liquid sorbent for the particular targeted gas. Use of the mass flow controller 25*a* and mass flow controller 25*b* provides for controlled dosing of the headspace of sorbent chamber 50. To provide an initial state, device 5 can be flushed or initiated with a gas mixture via a valve connected to a gas supply 23 (not shown), such as valve 30*h*, prior to the addition of the liquid sorbent to sorbent chamber 50. The gas mixture supplied to flush or initiate the system from gas supply 23 should mirror the gas mixture being used for measurements. Additional valves, such as valve 30*g*, can be used to direct the gas mixture from gas supply 23 to flow selection valve 110 which can then flow into sorbent chamber 50 via valve 30*b*. Valve 30*a* can be opened to initialize or flush the system with gas mixture from the gas supply. Alternatively, valve 30*a* can be open to vent the system. Once the liquid sorbent is introduced into sorbent chamber 50, gas recirculation pump 10 is turned on. Gas recirculation pump 10 recirculates the gas mixture through the liquid sorbent in the sorbent chamber 50 in a recirculation loop. In the recirculation loop are various values that can be opened or closed, including value 30*c*, valve 30*d*, valve 30*e*, and value 30*f*. Valves 30*c* and valve 30*d* are generally open so that the gas mixture is recirculated through sorbent chamber 50, while valves 30*e* and 30*f* are closed. However, if sorbent analysis and headspace analysis is too be performed then valve 30*f* may be open along with valve 30*c* and valve 30*d*. As shown in FIG. 1A, each of valve 30*a*-30*i* are depicted as having three ports (except for valve 30*b*). Valve 30*b* is a two-port valve that is open only when the two ports are open. In contrast, a valve that has three ports is open when two ports are open or when all three ports are open. A valve that is closed can have no ports open or only one port open. With regards to valves 30*a*-30*i*, the opening and closing of each of the valves can be by an electronic or analog process, or combination thereof. In a particular embodiment, valves 30*a*-30*i* comprise solenoids that are opened and closed electronically. In a further embodiment, a controller controls the opening or closing of valves 30*a*-30*i*. The controller can be directly or indirectly electronically connected to each of valves 30*a*-30*i* via wires, or directly or indirectly wirelessly connected to each of valves 30*a*-30*i*, or some combination thereof. In a certain embodiment, the controller, or a device connected to the controller, comprises a computer, tablet, or smart phone.

FIG. 1C provides a flowchart of an exemplary process that can be used to measure the sorption properties of a liquid sorbent for targeted gas using a gas-sorption measurement device of the disclosure. Initialization step 200 can be performed where a gas (e.g., $N_2$) or a gas mixture (e.g., $N_2$ and targeted gas) is introduced into the sorbent chamber (e.g., opening valve 30*h*) from a gas supply (e.g., gas supply 22) to flush the system and generate an appropriate atmosphere in sorbent chamber 50. Initialization step 200 is an optional step and does not start the actual gas-sorption measurement. Use of Initialization step 200, however, can provide an improvement in the accuracy of the gas-sorption measurement that is performed in the later steps. After the optional initialization step 200, the headspace is filled 210 with a gas mixture comprising the targeted gas having the same moles as the headspace volume, or alternatively, the headspace if filled with a gas lacking the targeted gas. In the former case, the gas-sorption measurement operates under a constant moles mode where the detector measures the rate of sorption of the targeted gas from the headspace of the sorbent chamber. In the latter case, the gas-sorption measurement operates under a constant pressure mode where a constant partial pressure of the targeted gas is maintained by introducing the targeted gas by a mass flow controller and measuring the total amount of the targeted gas introduced into the device. After the headspace is filled, then liquid sorbent is introduced into sorbent chamber 50 using a liquid handling pump, such as syringe pump 100*a*. After the system is sealed, gas recirculation pump 10 is turned on and the gas or gas mixture is circulated through the liquid sorbent so that equilibrium is achieved sooner. If device 5 uses a constant-moles mode then for target gas sorption 230, detector 7 measures the rate of sorption of the targeted gas from the headspace of the sorbent chamber. Alternatively, device 5 uses a constant-pressure mode then for target gas sorption 230, then the mass flow controller, such as mass flow controller 25*b*, senses a drop in partial pressure for the targeted gas and injects a defined amount of the targeted gas into the headspace of sorbent chamber 50, and the total amount of the targeted gas injected into the sorbent chamber 50 is measured or determined. The steps of sorbent analysis 240 and headspace analysis or drain 250 are optional steps, which are carried out after the gas-sorption measurement. A second recirculation loop is provided to carry out sorbent analysis 240 and a headspace analysis or drain 250 and includes valve 30*e* and valve 30*f*. The process, if not repeated, ends with the gas-sorption measurement generated in the step of target gas sorption 230. If additional gas-sorption measurements are to be performed, then the process further includes a cleaning step 260. For cleaning step 260, a reservoir comprising a solvent, such as DI water can be used to flush or clean the system of the liquid sorbent after the measurements are completed. In such a case, the reservoir (as well as syringe pump 100*c*) is connected to device 5 by way of valve 30*i*. As noted above, valve 30*i* comprises three ports, so DI water from the reservoir can be used to flush or clean the system while the port to syringe pump 100*c* is closed. Additionally, device 5 can be flushed out with a gas (e.g., $N_2$) or a gas mixture (e.g., $N_2$ and targeted gas) from a gas supply (e.g., gas supply 23). After cleaning step 260 either the process ends or the process is repeated starting from the headspace fill step 210.

TABLE 1

Listing of structural features depicted in FIGS. 1A-B

| Feature number | Feature Description |
|---|---|
| 5 | An exemplary gas-sorption device of the disclosure |
| 7 | A detector for measuring the partial pressure of a targeted gas |
| 10 | A gas recirculation pump |
| 15 | A liquid & gas manifold that is comprises liquid handling pumps and reservoirs. |
| 20 | A mounting plate |
| 22 | A gas supply that contains gas components making up a gas mixture and which includes a targeted gas component |
| 23 | A gas supply that can be used to flush or initialize the device |
| 25a | A mass flow controller that controllably introduces a gas or gas mixture into the sorbent chamber |
| 25b | A mass flow controller that controllably introduces a gas or gas mixture into the sorbent chamber |
| 30a | A valve with three closable ports |
| 30b | A valve with two closable ports |

TABLE 1-continued

Listing of structural features depicted in FIGS. 1A-B

| Feature number | Feature Description |
|---|---|
| 30c | A valve with three closable ports. |
| 30d | A valve with three closable ports |
| 30e | A valve with three closable ports |
| 30f | A valve with three closable ports |
| 30g | A valve with three closable ports |
| 30h | A valve with three closable ports |
| 30i | A valve with three closable ports |
| 35 | Vent for analyzing the liquid sorbent after the gas-sorption measurement |
| 40 | Knockout drum/vent for measuring headspace after the gas-sorption measurement |
| 45n | A plurality of a connectors (n = 1 to 10 or more) that can be used with device |
| 50 | Sorbent chamber that accommodates a liquid sorbent and headspace |
| 100a | Liquid handling pump that can comprise a liquid sorbent |
| 100b | Liquid handling pump that can comprise a liquid sorbent |
| 100c | Liquid handling pump that can comprise a liquid sorbent |
| 110 | A flow selection valve that is used to control the flow of liquids from the liquid handling pumps into the sorbent chamber |

EXAMPLES

Figure 2:
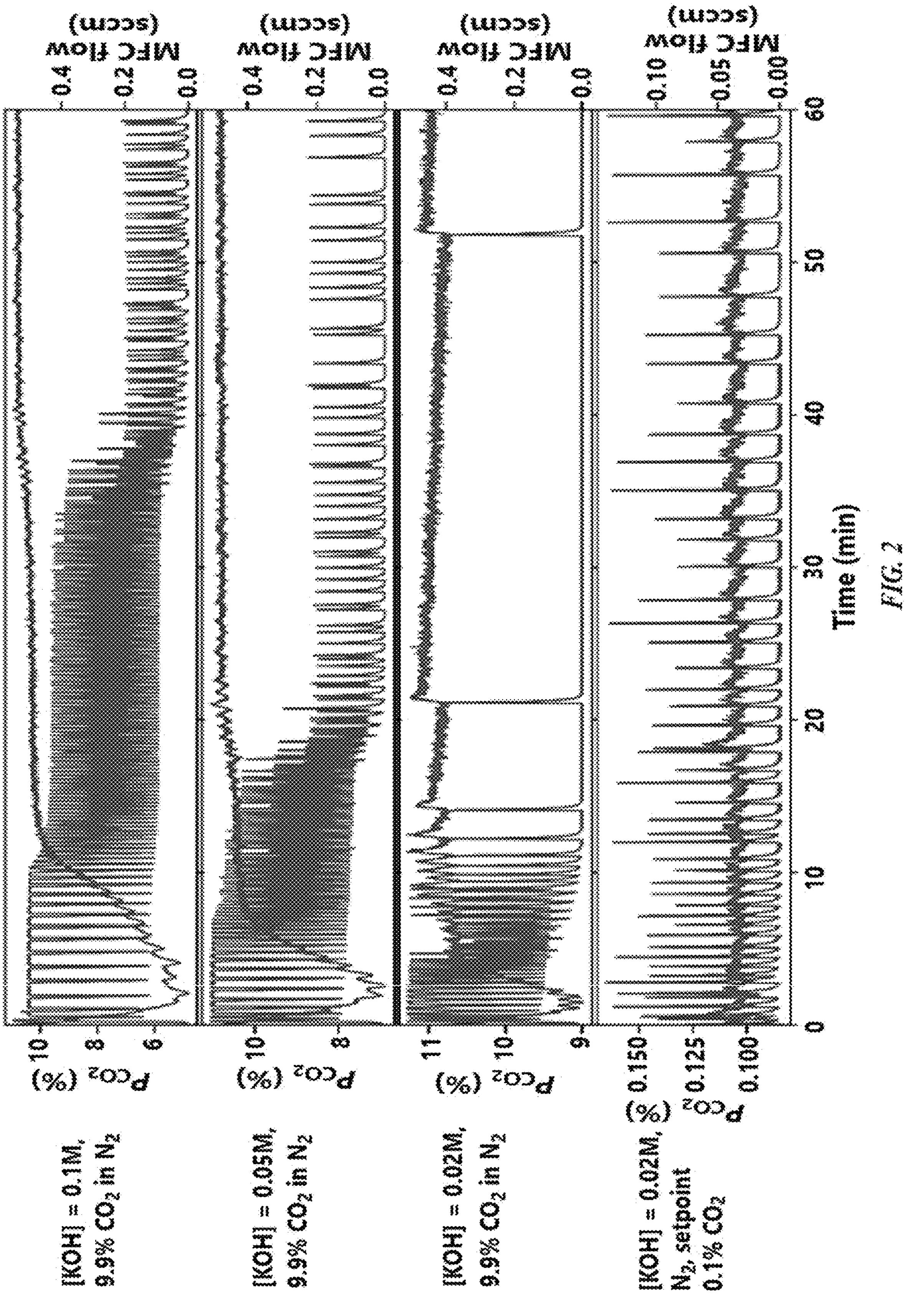
FIG. 2 shows sorption data from a $CO_2$ sensor (left axes) and the MFC (right axes) for 4 experiments with the noted combinations of aqueous [KOH] and headspace composition. After setting the partial pressure setpoint at the beginning of each experiment, $CO_2$ sorption by the liquid sorbent triggers injection of pure $CO_2$ in the headspace, as indicated by the spikes in the MFC flow rate. The stabilization of the partial pressure signal and concomitant lowering of the $CO_2$ injection frequency indicate that the headspace and liquid sorbent are approaching equilibrium.
Figure 3:
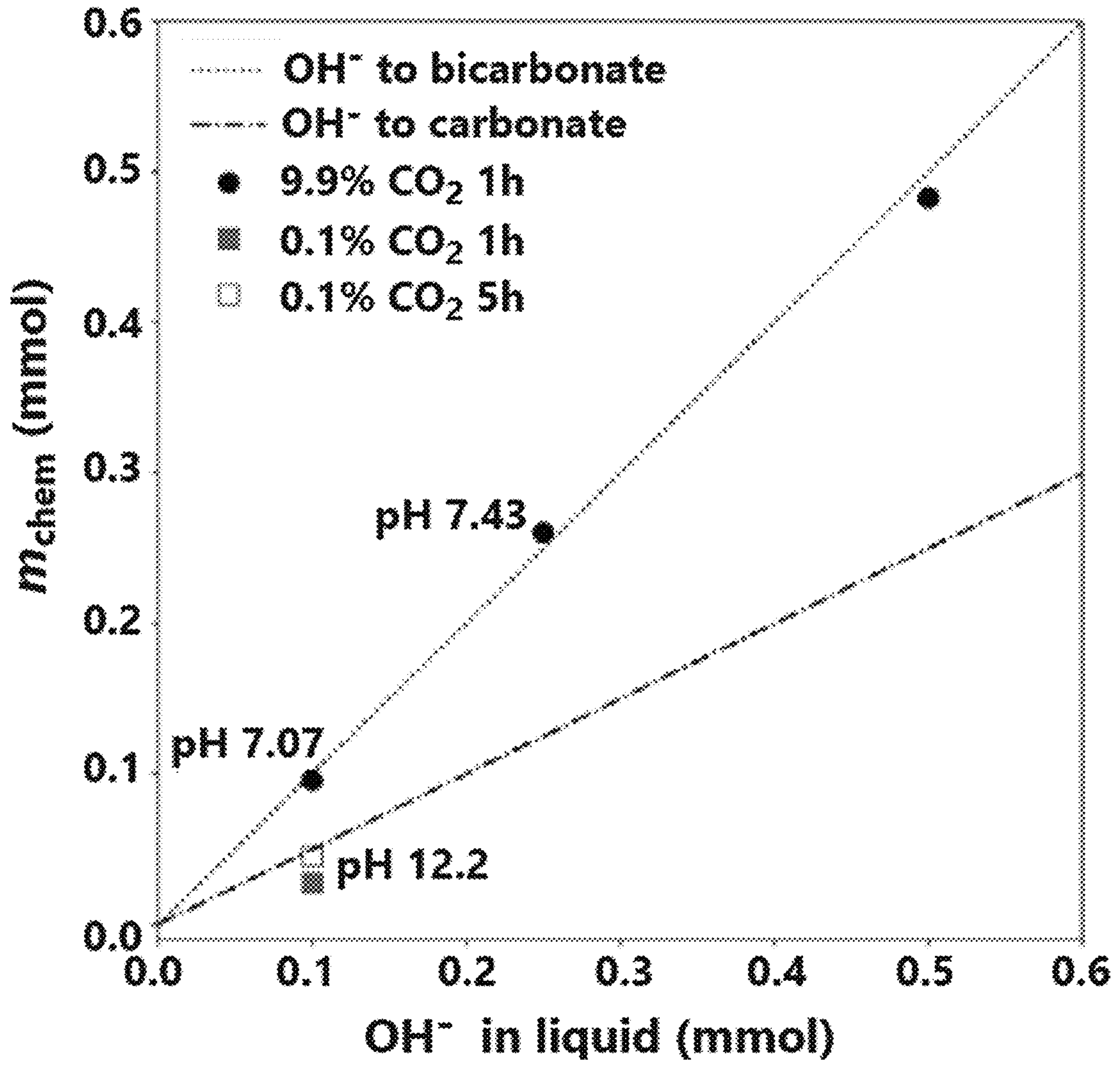
FIG. 3 summarizes the data acquired from the four 1-hour experiments in FIG. 2 to show the relationship between the inferred amount of chemisorbed $CO_2$ and the amount of OH in the initial liquid sorbent. The experiment with lowest [KOH] and partial pressure was extended to 5 hours, where the measured pH of the liquid sorbent (pH 12.2) corroborates the approximately 1:2 ratio of the chemisorbed $CO_2$ and hydroxide expected for formation of carbonate as the primary dissolved inorganic carbon species. For the other 3 experiments, this ratio is approximately 1:1, corresponding to the formation of bicarbonate.

Demonstration with hydroxide sorbent. To demonstrate the operation of the gas-sorption measurement device, two syringe pumps were loaded with deionized water and aqueous 0.2 M KOH solution. The programmed mixing of solutions from these syringe pumps enabled characterization of sorption from aqueous solutions containing 0.02, 0.05, and 0.1 M KOH. FIG. 2 presents experimental data for select combinations of [KOH] and $p_{co_2}$ where the $CO_2$ sorption is evidenced by an initial decrease in the $p_{co_2}$ signal, which triggers periodic injection of $CO_2$ to eventually restore the headspace to its initial value of $p_{co_2}$. For the aqueous KOH experiments, $m_{phys}$ is calculated as the product of the Henry's coefficient for $CO_2$ in water (0.033 M $atm^{-1}$) and the $p_{co_2}$ for the respective experiment. The reaction of $CO_2$ and $OH^-$ can result in either carbonate or bicarbonate, whose relative concentration may be determined by measuring the pH of the liquid, where carbonate is the dominant species above pH~10 and bicarbonate is the dominant species below pH~10. FIG. 3 shows the value of $m_{chem}$ with respect to the loading of KOH for each of the 4 experiments. For 3 of these experiments, the pH was measured after the gas-sorption experiment. The measurements with 9.9% $CO_2$ in the headspace follow the expected trend for reaction of $OH^-$ and $CO_2$ to form $KHCO_3$, which is corroborated by the measurement of near-neutral pH for each liquid. The measurement with 0.1% $CO_2$ more closely matches the expected value of $m_{chem}$ for the formation of $K_2CO_3$. Due the anticipated poor kinetics for equilibration due to the low $p_{co_2}$ and low initial [KOH], this measurement was extended to 5 hours, after which the measured pH of 12.15 corroborates the formation of carbonate. The equilibrium state is expected to involve carbonate as the majority species, and the inability to reach this state after 5 hours underscores the challenges of screening at low values of $P_{co_2}$, which are exacerbated by the poor kinetics for conversion of carbonate to bicarbonate.

Screening a molecular sorbent. A purpose of the gas-sorption measurement device is to characterize the chemisorption of a gas (e.g., $CO_2$) in a sorbent molecule R dissolved into a liquid solvent. If the chemisorbed state of the gas (G) is RG (e.g., $CO_2$ is $RCO_2$) the equilibrium of RG with sorbent R under partial pressure $p_G$ of a gas G can be described. Using $CO_2$ as an example the equilibrium of $RCO_2$ with the sorbent R under a $CO_2$ partial pressure $p_{co_2}$ is described by the binding constant in Eq. 1:

$$K = \frac{[RCO_2]}{[R]p_{CO_2}}, \quad (1)$$

where $p_{co_2}$ is a fraction with respect to the standard condition of 1 atm such that K is unitless. Starting with a molar loading of sorbent $m_0$, the $CO_2$ sorbed during the CCSI experiment ($m_{tot}$) is adjusted by $m_{phys}$, which is assumed to be independent of the identity and concentration of R. The resulting amount of chemisorbed $CO_2$ ($m_{chem}$) is taken to be the amount of $RCO_2$. Under these assumptions, the quasi-equilibrium state observed at the end of a CCSI sorption experiment can be described by Eq. 2 for the apparent binding constant $K_{app}$ calculated from Eq. 1:

$$K_{app} = \frac{m_{chem}}{(m_0 - m_{chem})p_{CO_2}} \quad (2)$$

The error and uncertainty of this quantity will be minimized when the concentrations of R and $RCO_2$ are approximately equal, which for a given expected binding constant K is described as in Eq. 3:

$$p_{CO_2} \approx \frac{1}{K} \quad (3)$$

Eq. 3 guides the selection of the target gas in the design of experiments.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A device configured to analyze the sorption properties of a liquid sorbent for a targeted gas, the device comprising the following structural components:

a sorbent chamber configured to comprise the liquid sorbent and a headspace above the liquid sorbent;

a first liquid handling pump that introduces the liquid sorbent into the sorbent chamber;

one or more mass flow controllers that is configured to introduce components of a gas mixture into the sorbent chamber, wherein one of the components of the gas mixture is the targeted gas that interacts with the liquid sorbent;

a detector configured to measure the partial pressure of the targeted gas in the headspace of the sorbent chamber;

a plurality of valves and vents that are in fluid communication with the sorbent chamber that are configured to open or close to modulate the flow of fluids in the device;

a gas recirculation pump configured to recirculate the gas mixture through the liquid sorbent in the sorbent chamber through a first recirculation loop;

, a second recirculation loop that is configured for liquid sorbent analysis; and a flow-through knockout drum that is configured to analyze the headspace of the sorbent chamber;

wherein the sorption properties of a liquid sorbent for the targeted gas is determined by the device operating in either (i) a constant moles mode where the detector is configured to measure the rate of sorption of the targeted gas from the headspace of the sorbent chamber, or (ii) a constant pressure mode where a constant partial pressure of the targeted gas is maintained by introducing the targeted gas by a mass flow controller and measuring the total amount of the targeted gas introduced into the device.

2. The device of claim 1, wherein the detector comprises an infrared sensor to measure the partial pressure of the targeted gas.

3. The device of claim 1, wherein the plurality of valves comprise solenoid valves that are electronically opened and closed.

4. The device of claim 3, wherein the device further comprises:

a controller that controls the opening and closing of the solenoid valves.

5. The device of claim 1, wherein the gas recirculation pump is a peristaltic pump or a diaphragm pump.

6. The device of claim 1, wherein the device further comprises components to flush and/or initialize the sorbent chamber and the first recirculation loop, the components comprising:

a second liquid handling pump that is configured to introduce a solvent into the sorbent chamber to displace the liquid sorbent; and a flush valve that is connected to a gas supply comprising a gas or gas mixture that is configured to flush or initialize the system with the gas or gas mixture of the gas supply when opened.

7. The device of claim 1, wherein the device further comprises a mounting plate that fixes a portion of the plurality of valves, and the sorbent chamber in a certain orientation when attached to the mounting plate.

8. The device of claim 1, wherein the device comprises:

the second recirculation loop; and the flow-through knockout drum.

9. The device of claim 1, wherein the device operates under constant pressure mode, and wherein the one or more mass flow controllers are programed to periodically introduce the gas mixture comprising the targeted gas to the sorbent chamber in order to maintain a defined partial pressure level for the targeted gas.

10. A device configured to analyze the sorption properties of a liquid sorbent for a targeted gas, the device comprising the following structural components:

a sorbent chamber configured to comprise the liquid sorbent and a headspace above the liquid sorbent;

a first liquid handling pump that introduces the liquid sorbent into the sorbent chamber;

one or more mass flow controllers that is configured to introduce components of a gas mixture into the sorbent chamber, wherein one of the components of the gas mixture is the targeted gas that interacts with the liquid sorbent;

a detector comprising an infrared sensor configured to measure the partial pressure of the targeted gas in the headspace of the sorbent chamber;

a plurality of solenoid valves, and vents that are in fluid communication with the sorbent chamber that are configured to open or close to modulate the flow of fluids in the device;

a peristaltic or diaphragm pump configured to recirculate the gas mixture through the liquid sorbent in the sorbent chamber through a first recirculation loop;

a controller that electronically opens and closes the solenoid valves;

a second recirculation loop that is configured for liquid sorbent analysis; and a flow-through knockout drum that is configured to analyze the headspace of the sorbent chamber;

wherein the sorption properties of a liquid sorbent for the targeted gas is determined by the device operating in either (i) a constant moles mode where the detector is configured to measure the rate of sorption of the targeted gas from the headspace of the sorbent chamber, or (ii) a constant pressure mode where a constant partial pressure of the targeted gas is maintained by introducing the targeted gas by a mass flow controller and measuring the total amount of the targeted gas introduced into the device.

11. The device of claim 10, wherein the controller comprises a computer or cell phone that electronically or wirelessly controls the operation of the solenoid valves.

12. The device of claim 10, wherein the device further comprises components to flush and/or initialize the sorbent chamber and the first recirculation loop, the components comprising:

a second liquid handling pump that is configured to introduce a solvent into the sorbent chamber to displace the liquid sorbent; and a flush valve that is connected to a gas supply comprising a gas or gas mixture that is configured to flush or initialize the system with the gas or gas mixture of the gas supply when opened.

13. The device of claim 10, wherein the device further comprises a mounting plate that fixes a portion of the plurality of valves, and the sorbent chamber in a certain orientation when attached to the mounting plate.

14. The device of claim 10, wherein the device comprises:

the second recirculation loop; and the flow-through knockout drum.

15. The device of claim 10, wherein the device operates under constant pressure mode, and wherein the one or more mass flow controllers are programed to periodically introduce the gas mixture comprising the targeted gas to the sorbent chamber in order to maintain a defined partial pressure level for the targeted gas.

16. A device configured to analyze the sorption properties of a liquid sorbent for a targeted gas, the device comprising the following structural components:

a sorbent chamber configured to comprise the liquid sorbent and a headspace above the liquid sorbent;

a first liquid handling pump that introduces the liquid sorbent into the sorbent chamber; one or more mass flow controllers that is configured to inject components of a gas mixture into the sorbent chamber, wherein one of the components of the gas mixture is the targeted gas that interacts with the liquid sorbent;

a detector comprising an infrared sensor configured to measure the partial pressure of the targeted gas in the headspace of the sorbent chamber;

a plurality of solenoid valves, and vents that are in fluid communication with the sorbent chamber that are configured to open or close to modulate the flow of fluids in the device;

a peristaltic or diaphragm pump configured to recirculate the gas mixture through the liquid sorbent in the sorbent chamber through a first recirculation loop;

a mounting plate that fixes a portion of the plurality of solenoid valves, and the sorbent chamber in a certain orientation when attached to the mounting plate;

a controller that electronically opens and closes the solenoid valves;

a second liquid handling pump that is configured to introduce a solvent into the sorbent chamber to displace the liquid sorbent; and a flush valve that is connected to a gas supply comprising a gas or gas mixture that is configured to flush and/or initialize the system with the gas or gas mixture of the gas supply when opened;

a second recirculation loop that is configured for liquid sorbent analysis; and a flow-through knockout drum that is configured to analyze the headspace of the sorbent chamber;

wherein the sorption properties of a liquid sorbent for the targeted gas is determined by the device operating in either (i) a constant moles mode where the detector is configured to measure the rate of sorption of the targeted gas from the headspace of the sorbent chamber, or (ii) a constant pressure mode where a constant partial pressure of the targeted gas is maintained by introducing the targeted gas by a mass flow controller and measuring the total amount of the targeted gas introduced into the device.

17. The device of claim 16, wherein the device comprises:

the second recirculation loop; and the flow-through knockout drum.

18. A method of measuring the sorption properties of a liquid sorbent for a targeted gas using the device of claim 1, the method comprising:

introducing a liquid sorbent and a gas mixture comprising a targeted gas that interacts with the liquid sorbent into the sorbent chamber;

turning on the gas recirculation pump;

injecting the gas mixture comprising the targeted gas to the sorbent chamber periodically in order to maintain a defined partial pressure level for the targeted gas;

measuring the partial pressure of the targeted gas in the headspace of the sorbent chamber in a continuous or periodic manner over a defined period of time;

identifying the total amount of targeted gas that is supplied to the device; and calculating the sorbent properties of the liquid sorbent for the targeted gas based upon the total amount of targeted gas that is supplied to the device.

19. The method of claim 18, wherein the targeted gas is selected from $CO_2$, CO, $SO_2$, $H_2S$, $CS_2$, NO, volatile organic compounds (VOCs), HCHO, $NH_3$, $NO_X$, CFC, $N_2$, $O_2$, ozone, hydrogen, $N_2O$, methane, ethane, propane, acetylene, butane, and any combination of these gasses.

20. The method of claim 19, wherein the targeted gas is $CO_2$.

* * * * *